United States Patent Office 2,844,918
Patented July 29, 1958

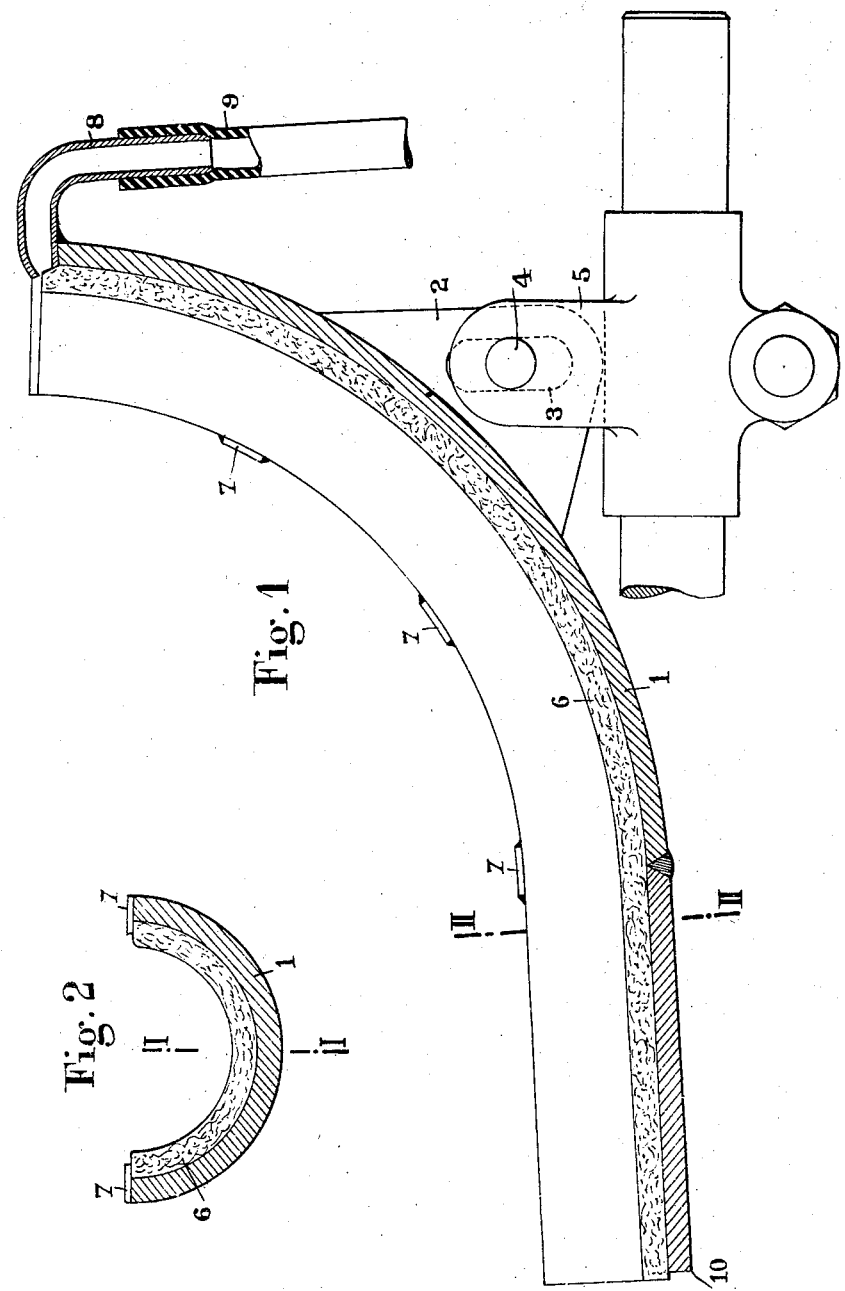

2,844,918

CHUTE FOR CONVEYING MOLTEN GLASS PARISONS

Edmond Van de Walle, Charles Van de Walle, and Emile Bonnefoy, La Varenne, France, assignors to Société Anonyme dite: Jerome & Bonnefoy & Cie, Courbevoie (Seine), France Application June 22, 1955, Serial No. 520,662

5 Claims. (Cl. 49—14)

In the manufacture of glass articles, rotary-bed machines are employed which comprise operation stations disposed at spaced angular intervals about the centre of the bed. The parisons of molten glass are delivered from a same and single distributor called "feeder" to the different operation stations, by turn, as they move past the delivery end of a chute or spout directing the parisons from the feeder.

To this end the feeder delivers the parisons at regularly spaced time intervals corresponding to the successive operations of a mechanically actuated shearing device adapted to cut the glass blocks as they emerge from the tap hole of the glass-furnace. The velocity of rotation of the rotary bed or table is so calculated that each time-period separating two successive passages of operation stations in front of the chute is strictly equal to the time interval elapsing between two successive corresponding releases of the shearing device of the distributor, this setting being obtained by providing a positive mechanical drive of the gear or like type between the shearing device control mechanism and the rotary-bed actuating mechanism.

Thus, once the initial setting of the rotary-bed has been properly made, each parison distributed by the chute will fall exactly upon one of the operation stations of this bed provided, of course, that the time required for the parison to move by gravity from the shearing device of the feeder to the rotary-bed is unvariable from one parison to another. For this purpose, extremely steep chutes have already been proposed in view of reducing to a minimum the uncertainty regarding the falling time.

However, this solution did not provide a really perfect constancy in the falling times on account of the unavoidable roughness of surface of the chute, and moreover this arrangement was inconvenient in that as the parison hit the chute or the rotary-bed it was flattened in the region of impact. The thus flattened zone of each parison cooled more quickly and was a source of glass wastage.

Now, it is the essential object of this invention to provide a chute for the purposes specified hereinabove which is characterized in that the parison will roll and slide thereon at a relatively high speed and each time in an absolutely identical fashion, therefore with a constantly unvariable falling time, and without hitting neither the chute as the parison engages same, nor the working bed as the parison is discharged thereon.

This chute consists of a trough of curved shape lined internally with a relatively thick layer of woven material kept in a constantly soaked condition by a stream of running water.

According to a preferred embodiment of the invention the longitudinal contour of the chute is arcuated with its uppermost portion substantially tangent to the vertical and its lowermost portion substantially rectilinear and horizontal.

Other features and advantages of this invention will appear as the following description proceeds with reference to the accompanying drawing forming part of this specification and illustrating diagrammatically by way of example the manner in which the invention may be carried out in the practice. In the drawing:

Figure 1 is a longitudinal axial section of the chute, the section being taken upon the line I—I of Fig. 2; and Figure 2 is a cross-section taken upon the line II—II of Fig. 1.

The chute shown in the drawing comprises essentially a trough 1 for example of metal or plastic material, having a concave cross-section with the concavity turned upwardly as shown, so as to form an open culvert. The longitudinal outline of this chute, as shown in Fig. 1, is generally curvilinear and admits at its upper end portion a vertical or substantially vertical tangent, the lowermost portion of the chute being substantially rectilinear and horizontal, as shown.

The chute 1 is secured on an arm 2 having a slot 3 formed therein to permit the adjustment and pivotal movement of the arm in relation to a support 5 provided with an adjustment bolt 4 extending through the slot 3.

The chute 1 is lined internally with woven or like material 6 having a thickness of the order of a few millimeters. A slight gap may be left between the adjacent surfaces of the material 6 and chute 1. The lining 6 may consist, if desired, of a cotton fabric of the type employed in the manufacture of conveyor belts or the like, and its thickness may range from about $\frac{3}{16}''$ to $\frac{1}{4}''$. This lining is secured on the edges of the chute 1 by means of clips shown diagrammatically at 7.

A pipe 8 issuing from the rear has one end connected to a water supply hose 9 and its other end leading into the upper portion of the chute 1 and centrally thereof, as shown.

The chute is utilized as follows:

Running water is admitted into the hose 9 and as this water is delivered from the pipe 8 it soaks completely the woven material 6 and constitutes a sheet or layer of substantially constant thickness flowing down the chute. The water leaves the chute 1 by falling freely from the lower edge 10 thereof.

If under these conditions a parison of molten glass is dropped upon the upper portion of the chute, the parison will hit the sheet of running water flowing over the fabric 6 in a substantially tangent direction and the impact is damped out by both the sheet of water and the fabric. Thus after the initial impact, the parison will continue its high-speed downward movement over the surface of this sheet, without penetrating deeply neither into the water nor into the fabric. In fact, as the molten glass engages the water sheet a steam layer is formed and the resiliency of this steam layer is such as to counteract any tendency of the mass of molten glass to penetrate more deeply into the underlying water sheet. The parison will thus slide and roll over the sheet of water somewhat like a drop of water moving over the hot surface of a stove-plate, with the important difference however that the volume of the parison is not reduced as the movement takes place. The parison will thus leave the chute at the lowermost portion thereof in a horizontal direction and be deposited onto the working table or operation station of the rotary-bed without any further impact or fall. As a consequence, no severe impact is applied to the parison, either as it engages the chute nor as it reaches the rotary-bed, and its shape will remain unaltered. The downward movement of the parison over the water surface occurs at a relatively high speed, and this speed is very constant from one parison to another. The water-soaked cotton lining is left unaltered by the passage of the parisons from one to the other end of the chute.

The horizontal velocity at which the parison is delivered by the chute onto the working bed may be adjusted to a certain extent by modifying the inclination of the arm 2 about the adjustment bolt 4 so as to alter the angular setting of the chute. The level at which the parisons are delivered by the chute is also adjustable within very accurate limits by setting the height of the bolt 4 in the slot 3 in accordance with the desired chute height.

The chute according to the invention is characterized by the following advantages:

(1) The falling time is always perfectly constant from one parison to another.

(2) The parison is not damaged by any severe shock as it engages the chute, since the impact, if any, is damped out by the relatively thick cotton lining.

(3) With a chute of this type any lubricants such as oil may be dispensed with.

Of course, it would not constitute a departure from the invention if a few non-essential constructional details of the device described by way of example hereinabove were modified to suit specific applications. Thus, the cross-sectional shape of the chute may differ from the semi-circular one illustrated and have a different contour, provided that its concavity is directed upwardly, for example a U-shaped contour. On the other hand, the lining 6, instead of consisting of cotton, may be made of any other suitable woven or like material.

What we claim is:

1. A chute for continuously distributing molten-glass parisons onto a working table, which comprises a trough-like member having a concave cross-section with the concavity turned upwards and an arcuate longitudinal contour with a substantially vertical upper portion to receive said parisons and a substantially horizontal and rectilinear lower end portion to deliver said parisons, a sheet of relatively thick soft woven material lining the concave inner surface of the trough, and means for continuously soaking the woven material.

2. A chute for continuously distributing molten-glass parisons onto a working table, which comprises a trough having an upwardly concave cross-section and an arcuate longitudinal contour with a substantially vertical upper portion to receive said parisons and a substantially horizontal and rectilinear lower end portion to deliver said parisons, a sheet of relatively thick continuous soft woven material lining the inner surface of said trough with a gap between said sheet and the trough bottom, means for fastening said sheet on said trough, and means for continuously soaking said woven material.

3. A chute for continuously distributing molten-glass parisons onto a working table, which comprises a trough having an upwardly concave cross-section and an arcuate longitudinal contour with a substantially vertical upper portion to receive said parisons and a substantially horizontal and rectilinear lower end portion to deliver said parisons, a sheet of relatively thick continuous woven material lining the inner surface of said trough, and a water inlet duct located centrally of the upper threshold of said chute.

4. A chute according to claim 1, further comprising positioning means for varying the inclination and height of the chute.

5. A chute according to claim 4, in which said positioning means comprises a lug rigid with said chute and formed with a vertically extending slot, an apertured support and bolt means adjustably engaged in the slot of said lug and aperture of said support.

References Cited in the file of this patent

UNITED STATES PATENTS

| | | |
|---|---|---|
| 679,705 | Sievert et al. | July 30, 1901 |
| 1,379,593 | Peiler | May 24, 1921 |
| 1,816,309 | Barker | July 28, 1931 |